United States Patent [19]

Ogawa

[11] 3,962,534
[45] June 8, 1976

[54] FACSIMILE SET

[75] Inventor: Mutsuo Ogawa, Tokyo, Japan

[73] Assignee: Ricoh Co., Ltd., Tokyo, Japan

[22] Filed: Oct. 2, 1974

[21] Appl. No.: 511,365

[30] Foreign Application Priority Data
Oct. 4, 1973   Japan.............................. 48-111648

[52] U.S. Cl.................................. 178/6; 179/2 DP
[51] Int. Cl.².......................................... H04N 1/32
[58] Field of Search ....................... 178/6; 179/2 DP

[56] References Cited
UNITED STATES PATENTS

| | | | |
|---|---|---|---|
| 3,444,315 | 5/1969 | Shimabukuro............................ | 178/6 |
| 3,445,587 | 5/1969 | Jansen.............................. | 178/6.6 R |
| 3,614,306 | 10/1971 | Goldberg.................................. | 178/6 |
| 3,646,255 | 2/1972 | Markow................................... | 178/6 |
| 3,745,251 | 7/1973 | Fretwell............................ | 179/2 DP |
| 3,772,456 | 11/1973 | Richeson............................ | 179/2 DP |
| 3,830,962 | 8/1974 | Mailloux................................. | 178/6 |

Primary Examiner—Howard W. Britton
Assistant Examiner—Michael A. Masinick
Attorney, Agent, or Firm—Cooper, Dunham, Clark, Griffin & Moran

[57] ABSTRACT

A facsimile system capable of automatically transmitting or receiving the image through a telephone channel is disclosed in which each facsimile set may automatically reset its facsimile recorder and reader when the intercommunication with the other subscriber's facsimile set is interrupted by an accident during the transmission and reception mode. The facsimile set includes means for disconnecting it from the telephone circuit and means for giving an operator suitable alarm or warning signals so that the transmission or reception may be started again from the beginning.

8 Claims, 7 Drawing Figures

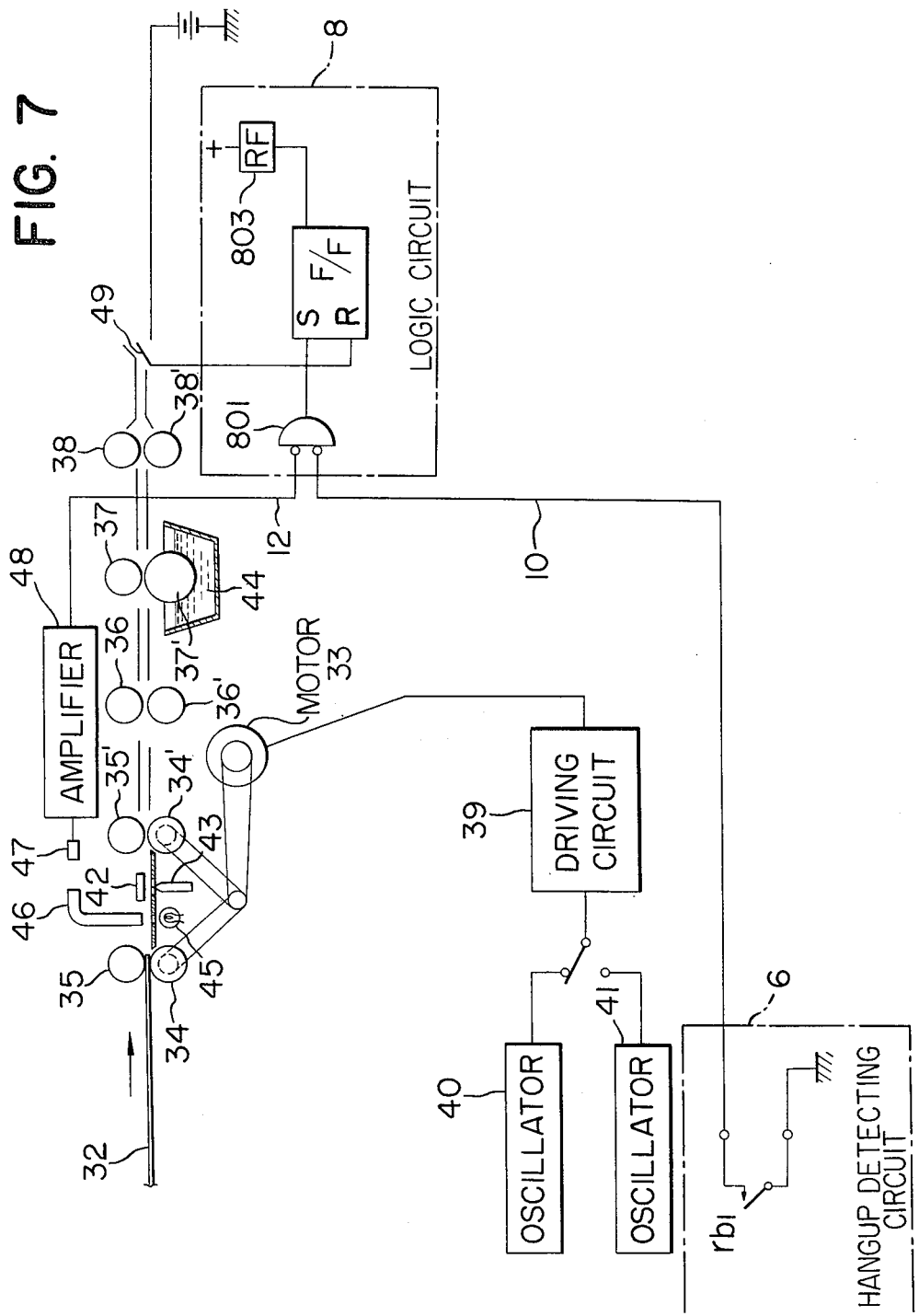

FACSIMILE SET

BACKGROUND OF THE INVENTION

The present invention relates to a facsimile set and more particularly a facsimile set capable of the automatic transmission and reception through the conventional telephone channel.

There has been devised and demonstrated a facsimile system in which unattended facsimile sets at remote stations are intercommunicated through the conventional telephone channel for automatic transmission and reception. A calling subscriber's facsimile set is automatically actuated at a predetermined time to connect it to the telephone line (or switch lit into the off-hook mode) and then transmit the digit pulses for calling a desired subscriber's facsimile set. In response to the ringing signal, the called subscriber's facsimile set is automatically actuated to establish the DC telephone circuit or loop with the calling facsimile set. The facsimile system of the type described is similar in operation to a telephone answering system which answers the incoming calls with a prerecorded message when a subscriber is absent and permits the caller to record a message in turn. When the called facsimile set is actuated, it accomplishes a routine check to see if it is in the conditions capable of receiving and reproducing the image transmitted. If the called facsimile set is ready for reception, it answers back so that the calling facsimile set starts the transmission of the image. The called facsimile set reproduces the image transmitted, and after the reproduction of all the images transmitted, it is reset to the initial state and is disconnected from the telephone circuit with the calling subscriber. In like manner, after the transmission of all the images required, the calling facsimile set resets to the initial state and is automatically disconnected from the telephone circuit with the called facsimile set, that is, it is switched to the on-hook mode.

In the facsimile system of the type described, both the calling and called facsimile sets are reset to the initial state after the transmission and reception have been accomplished under the normal conditions. Therefore they are ready to receive a call from any other subscribers. However the normal transmission and reception are often disturbed by various reasons. For instance, (1) when the power supply is cut off, (2) when too many errors are found in transmitted data, (3) when erratic operations are caused by an operator or (4) when erratic operation of a telephone switching system occurs, both the calling and called facsimile sets must be immediately hung up or switched into the "on-hook" mode to be disconnected from the telephone circuit.

However, when the master and the recording sheet still remain at the reading and recording positions, respectively, this means that both the calling and called facsimile sets are still busy. As a result, even when they are called again, they cannot answer so that the intercommunication between these facsimile sets cannot be established any longer. Therefore there can be no re-transmission, and the signal representing the disabled facsimile set cannot be received. It is of course undesirable for the facsimile sets to remain in such disabled conditions for a long time.

One of the objects of the present invention is to provide a facsimile system in which when the hangup of a calling or called facsimile set occurs, the master or recording sheet may be immediately removed out of the reading or recording position and the facsimile reader or recorder may be immediately reset so that the intercommunication between the calling and called facsimile sets may be recovered within a short time.

Another object of the present invention is to provide a facsimile set in which when the hangup occurs during the transmission or reception, alarm or warning means gives the alarm or warning signals to the operator so that he may immediately start again the transmission or reception from the beginning.

To attain the above and other objects, a facsimile set in accordance with the present invention includes means for detecting its own hangup and/or hangup of the other subscriber's facsimile set, and means for detecting whether or not the master or recording sheet remains in the reading or recording position when the hangup occurs. In response to the outputs of the above two means, the facsimile set is automatically disconnected from the telephone circuit, and the master or recording sheet is immediately discharged out of the reading or recording position so that the facsimile reader or recorder may be reset for re-transmission or re-reception from the beginning. Moreover alarm or warning means is provided to give alarm or warning signals to the operator.

The present invention will become more apparent from the following description of the preferred embodiments thereof taken in conjunction with the accompanying drawing.

BRIEF DESCRIPTION OF THE DRAWING:

FIG. 7 is a detailed diagram used for the explanation of a facsimile recorder 4 shown in FIG. 1 and its associated circuits.

Figure 1:
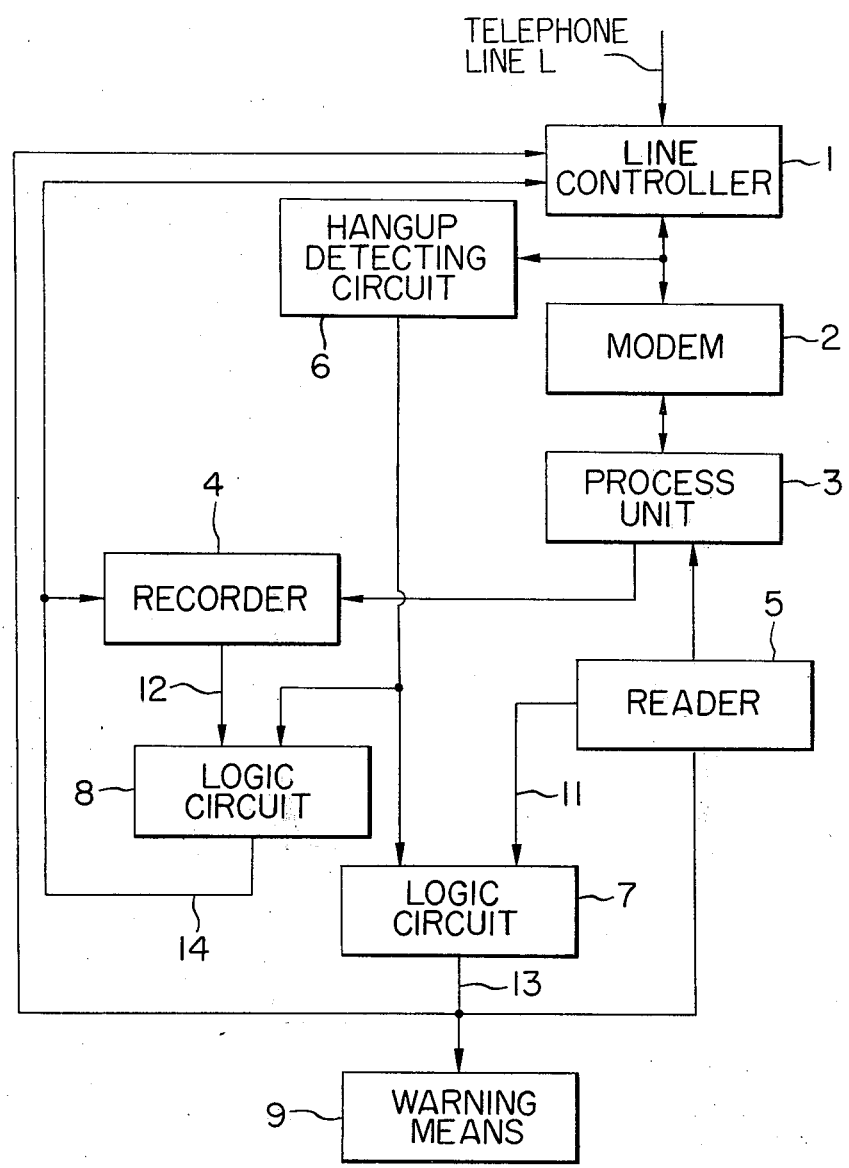
FIG. 1 is a block diagram of a facsimile set in accordance with the present invention.

DESCRIPTION OF THE PREFERRED EMBODIMENTS:

Referring to FIG. 1, a facsimile set incorporating the present invention generally comprises a line controller 1 connected to a telephone channel L and adapted to transmit the dial pulses or digits dialed in case of transmission, to detect the ringing signal in case of reception, to close the DC circuit in case of communication, and so on as with the case of the conventional dial telephone set; a modem 2 for modulating the facsimile signal to be transmitted and demodulating the incoming signal; a processing and control unit 3; a facsimile recorder 4 for reproducing the image transmitted, and a facsimile reader 5 for converting the image to be transmitted into the electrical signals. The facsimile set with the above construction is of the conventional type, and its automatic transmission-reception system is not shown.

Since the facsimile set of the type described is well known in the art, only brief description of the mode of operation thereof shall be made in this specification. In case of reception mode, the ringing signal is transmitted from a calling subscriber through the telephone channel L to the line controller 1 so that a hookswitch in the controller 1 is closed to establish the DC telephone circuit with the calling subscriber's facsimile set. Thereafter the line controller 1 answers back or transmits the reception-ready signal to the calling subscriber so that the facsimile signal is transmitted through the telephone channel L, the line controller 1 and the modem 2 to the processing and control unit 3 which expands the transmitted facsimile signal, which is compressed, into the signals in response to which the facsimile recorder may reproduce the transmitted image. The processing and control unit 3 also performs the overall control of the facsimile set including the synchronization with the calling facsimile set.

In the transmission mode, the hookswitch in the line controller 1 is closed, and then the pulses or digits dialed are transmitted for calling a desired subscriber. When the telephone circuit is established between the calling and called subscribers, the facsimile reader 5 converts the image to be transmitted into the electrical signals which are sequentially applied to the processing and control unit 3. The unit 3 compresses the image signals and establishes the synchronization with the called facsimile set in the conventional manner. Thus the compressed image signals are transmitted through the modem 2, the line controller 1, and the telephone channel L to the called subscriber's facsimile set.

Referring still FIG. 1, according to the present invention, the facsimile set further comprises an automatic resetting system comprising a hangup detecting circuit 6, transmitter-hangup logic circuit 7, a receiver-hangup logic circuit 8, and an alarming or warning means 9. The hangup detecting circuit 6, which is connected to the line controller 1, has a function to detect whether or not the calling and called facsimile sets are actually intercommunicated. That is, when the other called or calling subscriber's facsimile set is hung up, the signal 1 is applied to both the logic circuits 7 and 8. To the logic circuit 7 is also transmitted through a line 11 from the facsimile reader 5 the signal representing whether the master or image to be transmitted is placed or not in the facsimile reader 5. In like manner, the signal representing whether the recording sheet is placed or not in the facsimile recorder 4 is transmitted from the facsimile recorder 4 through a line 12 to the logic circuit 8.

Next the mode of operation will be described. When the other called subscriber's facsimile set is hung up while the facsimile set shown in FIG. 1 is in the transmission mode so that the facsimile reader 5 is reading the master or image to be transmitted, the hangup is detected by the hangup detecting circuit 6 so that the hangup signal is applied to the receiver-hangup logic circuit 7 through the line 10. Since the master is placed in and read by the facsimile reader 5, the signal is also transmitted to the logic circuit 7 from the reader 5. As a result, the signal 1 appears on the output line 13 of the logic circuit 7 so that in response to this signal the line controller 1 hangs up the calling facsimile set to disconnect it from the telephone channel L. Meanwhile, also in response to this signal 1, the facsimile reader 5 is switched to a high speed mode so that the master or image to be transmitted is immediately removed out of the reading position. The output signal 1 of the logic circuit 7 is also transmitted to the alarm or warning means 9 so that the warning signal is produced. Therefore the operator may be advised that the calling facsimile set is hung up so that he must start again the transmission from the beginning.

When the other calling facsimile set is hung up in the reception mode of the facsimile set shown in FIG. 1, the hangup detecting circuit 6 gives the signal 1 to the logic circuit 8. When the signal representing that the recording sheet is placed in the facsimile recorder 4 is also applied to the logic circuit 8, the output signal 1 is transmitted to both the line controller 1 and the facsimile recorder 4. As a result, the line controller 1 disconnects the called facsimile set from the telephone channel L and the facsimile recorder 4 is switched to a high-speed mode so that the recording sheet may be immediately removed out of the recording position. Therefore the called facsimile set is automatically reset and is ready to be called again by the calling subscriber.

Next the hangup detecting circuit 6 will be described in more detail hereinafter. In general in the facsimile system utilizing the telephone channel, there are four methods for detecting the hangup of the other subscriber's facsimile set. That is, the first method is to detect the hangup in response to the interruption of the carrier transmission; the second method is to detect the hangup from the reversal of polarities of the pair of telephone lines; the third method is to detect the hangup in response to the variation in level of the output of the telephone channel; and the fourth method is a combination of the above methods. The first method is based on the fact that the continuous transmission of carrier from the other subscriber is immediately interrupted as soon as the other facsimile set is hung up. The second method is based upon the fact that when the calling subscriber's facsimile set is intercommunicated with the called subscriber's facsimile set, the polarities of the pair of telephone lines interconnecting them are reversed and when the called subscriber hangs up, the polarities are reversed again to the initial state. The third method is based upon the fact that when the telephone circuit is established, a closed loop is established by a hybrid coil while this closed loop is opened when hung up. That is, the hangup of the called facsimile set may be detected by the comparison of the output of the calling facsimile set when the closed loop is established with the output when this closed loop is opened.

Next referring to FIG. 2, the hangup detecting circuit 6 based upon the second method utilizing the reversal in polarity of the telephone lines will be described hereinafter. It should be noted that because of the underlying principle of the method, only the hangup of the called facsimile set may be detected. When a contact $rc_1$ in the line controller 1 is closed, a DC closed loop is established which interconnects the telephone lines $L_1$ and $L_2$ through transformer T. The actions of contacts $rd_1$, $rd_2$ and $rd_3$ are delayed behind that of the contact $rc_1$ in order to avoid adverse effects due to the closing of the contact $rc_1$. The relay or relays (not shown) for actuating these contacts $rc_1$ through rd-3 in case of transmission and reception are of the conventional type so that no further description shall be made in this specification.

In case of the reception mode, the contacts $rc_1$ and $rd_1$ are closed while the contact $rd_2$ is opened, the contact $rd_3$ being inserted into the secondary circuit of the transformer T. The voltage on the telephone line $L_1$ is positive while the voltage on the line $L_2$, negative.

A relay (RA) 601 in the hangup detecting circuit 6 is actuated to close contacts $ra_1$ and $ra_2$. The relay 601 is kept actuated because the contact $ra_1$ is closed, but a relay (RB) 602 is not actuated because a diode $D_2$ is inserted. When the other or called facsimile set is hung up, the polarities of the voltages of the telephone lines $L_1$ and $L_2$ are reversed so that the relay 602 is energized to close its contact $rb_1$, which is connected to the line 10 (See FIG. 1). Thus the signal H. U-1 representing the hangup of the other or called facsimile set is transmitted to the logic circuits 7 and 8 (See FIG. 1). When the contact $rc_1$ is opened, the relay 601 is de-energized so that the relay 602 is also de-energized.

Next referring to FIG. 3, the hangup detecting circuit 6 based upon the first method will be described hereinafter. It should be noted that the hangup of only the calling facsimile set is detected by this circuit. The carrier is detected by an AGC amplifier 603, a band-pass filter 604 and a r-f amplifier 605. Thereafter the carrier is converted into the DC signal by a rectifier circuit 606 and a low-pass filter 607, and is transmitted through a threshold circuit 608 to the gate G through a line 609. As long as the carrier transmission continues, the gate G is prevented from opening, but when the transmission is interrupted, the signal H.U-2 representing the hangup is transmitted from the gate through the line 10. In the reception mode, the signal 1 is always applied to the gate G from the facsimile recorder 5 (See FIG. 1).

Next referring to FIG. 4, the hangup detecting circuit 6 based upon the third method will be described hereinafter. Because of the limitation on communication links, the detecting circuit of the type shown in FIG. 4 is adapted for use in a relatively short telephone communication channel. The circuit is substantially similar in construction to that shown in FIG. 3. That is, the output of the line controller 1 is amplified by an amplifier 611, and then converted into DC signal by a rectifier circuit 612 and a low-pass filter 613, and transmitted through a threshold circuit 614 and the line 10. When the voltage level on the telephone line L changes, this change is detected by the threshold circuit 614, and the signal H.U-3 representing the hangup of the other subscriber's facsimile set appears on the line 10.

Figure 2:
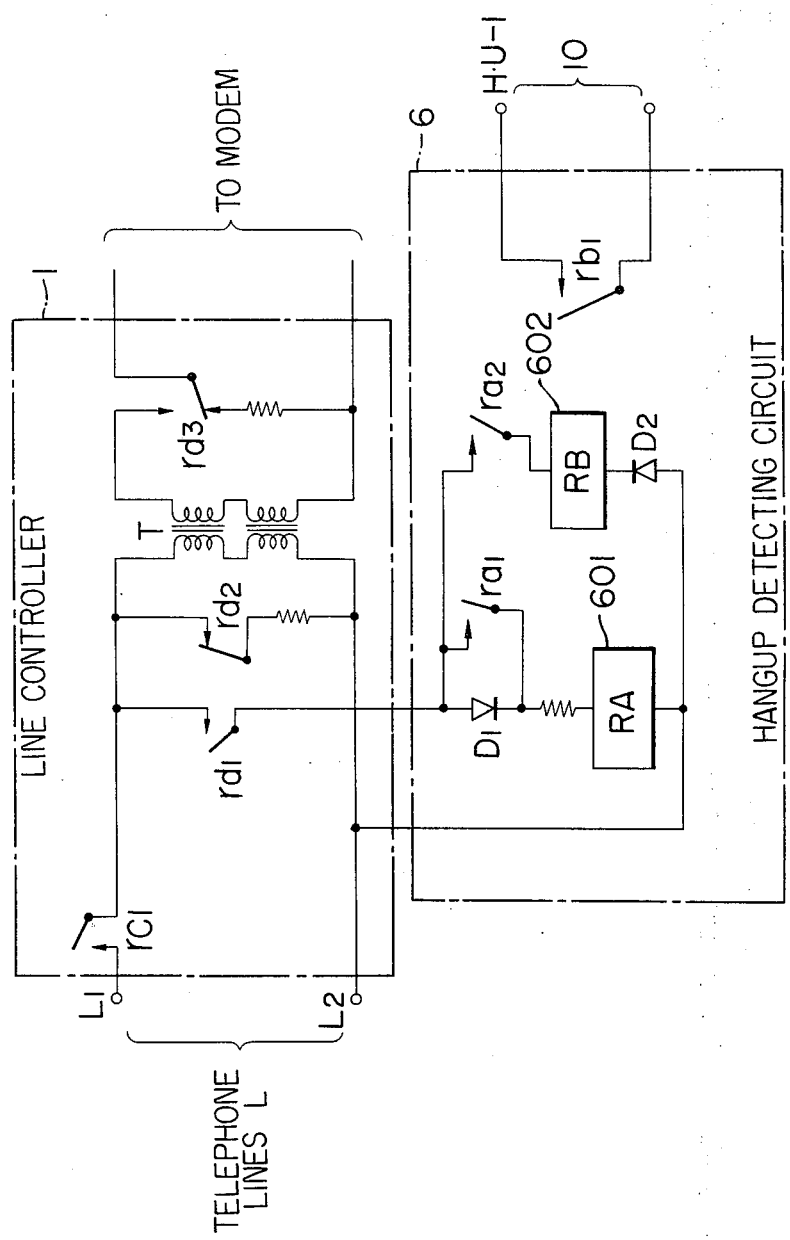
FIGS. 2, 3, and 4 are diagrams of hangup detecting circuits in accordance with the present invention.
Figure 3:
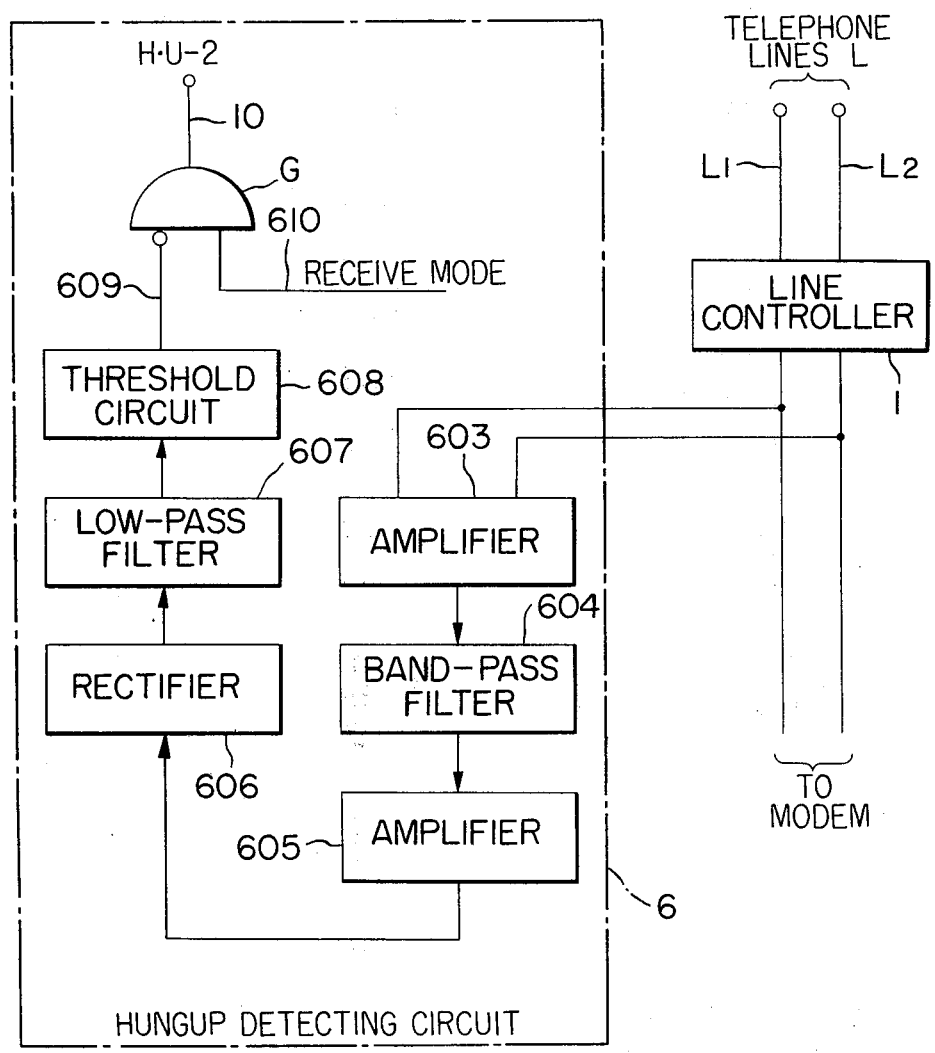
Figure 4:
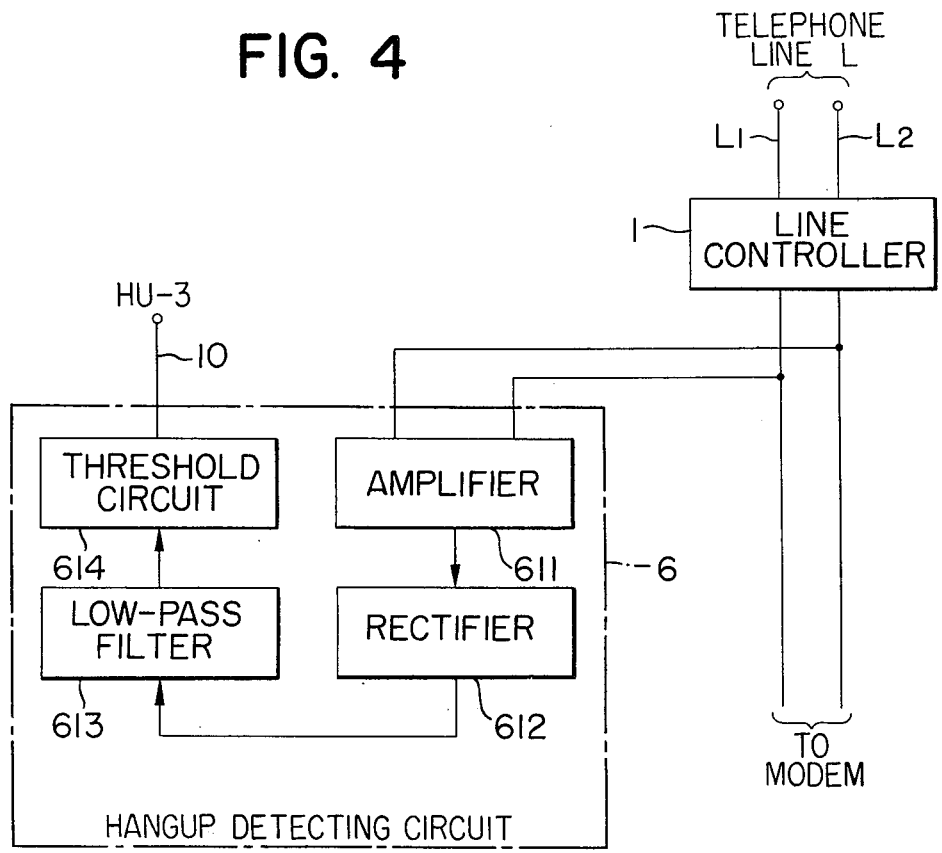

The hangup detecting circuits 6 described hereinbefore with reference to FIGS. 2, 3 and 4 can detect the hangup originated only in the calling or called facsimile set. Therefore it is preferable in practice to provide a hangup detecting circuit capable of detecting the hangup originated in both the calling and called facsimile sets by combining the detecting circuits shown in FIGS. 2, 3 and 4 as will be described hereinafter with reference to FIG. 5.

Figure 5:
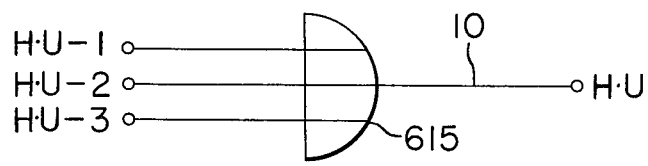
FIG. 5 is a diagram of a logic circuit to which are applied the outputs of the hangup detecting circuits shown in FIGS. 2, 3 and 4.

Referring to FIG. 5, the hangup signals H.U-1, H.U-2, and H.U-3 derived from the detecting circuits shown in FIGS. 2, 3, and 4, respectively, are applied to an OR gate 615 so that any of the hangup signals derived may be transmitted through the line 10.

In the conventional telephone switching systems, the busy tone is transmitted to the other subscriber when one subscriber hangs up. Therefore a hangup detecting circuit capable of detecting the hangup in response to the busy tone transmitted may be arranged. This arrangement is advantageous in that the hangup of the other party may be detected regardless whether he is called or calling.

Figure 6:
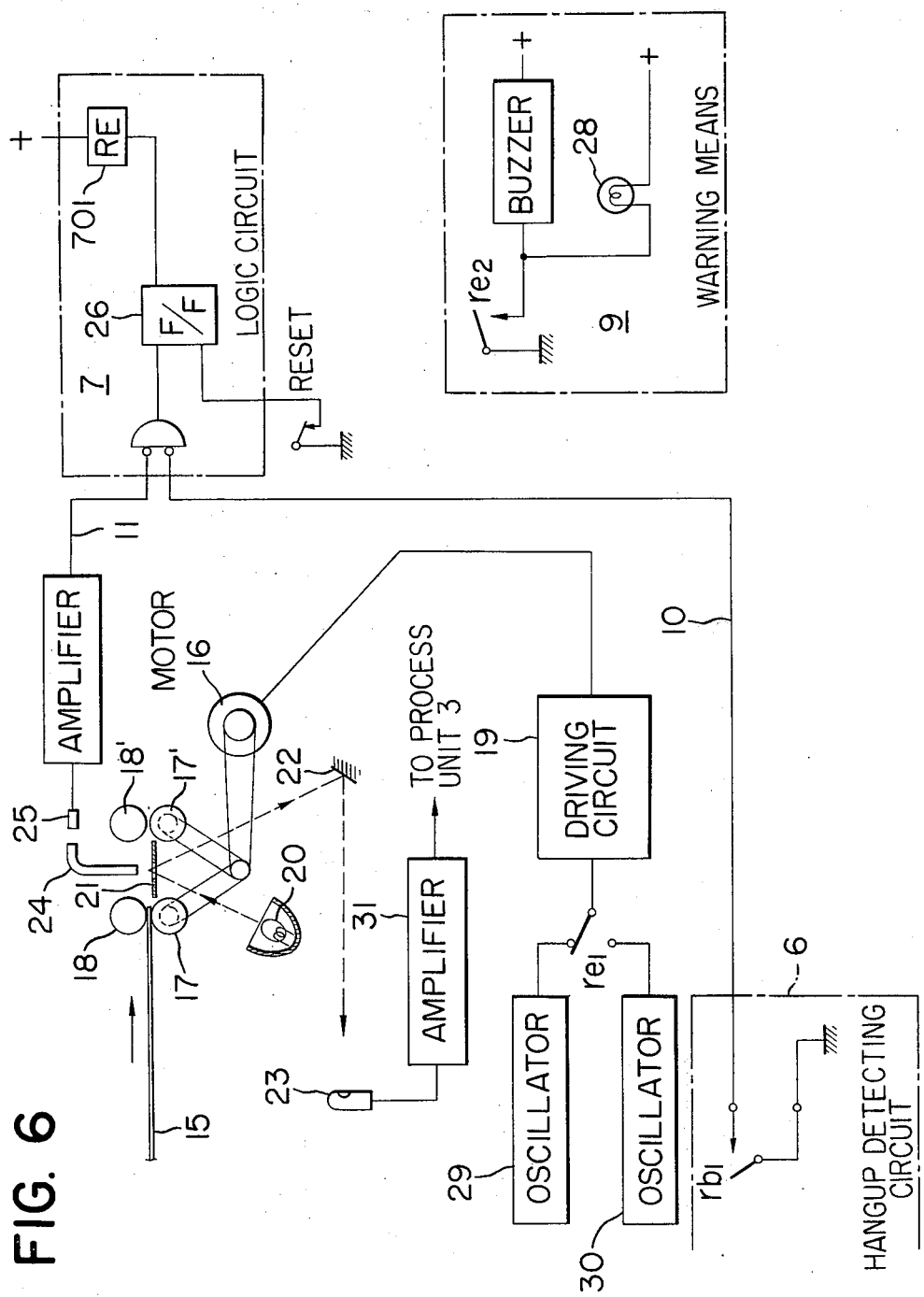
FIG. 6 is a detailed diagram used for the explanation of a facsimile reader 5 in FIG. 1 and its associated circuits.

Next referring to FIG. 6, the facsimile reader 5, the logic circuit 7, and the alarm or warning means 9 will be described in more detail hereinafter. A master 15 or image to be transmitted is transported in the direction indicated by the arrow by a pair of feed rollers 17 and 17' which in turn are driven by a step motor 16 and are made into engagement with pinch rollers 18 and 18', respectively. A driving circuit 19 which supplies the power to the motor 16 receives the output of an oscillator 29 or 30 through a contact $re_1$ in a relay (RE) 701 in the logic circuit 7. The oscillation frequency of the oscillator 29 is lower than that of the oscillator 30. In the transmission mode, the contact $re_1$ is switched to connect the oscillator 29 to the driving circuit 19 so that the motor 16 rotates at a low speed. Thus the master 15 is transported at a predetermined reading speed. Light emitted from a light source 20 passes through a slit 21 and is reflected back from the master 15 and then by a reflecting mirror 22 to impinge upon a photoelectric transducer 23. The output of the photoelectric transducer 23 is amplified by an amplifier 31 and transmitted to the processing and control unit 3 (See FIG. 1). An optical fiber tube 24 is disposed immediately above the slit 21 in order to detect whether the master 15 is at the slit 21 or the reading position. That is, light passing through the slit 21 is transmitted through the optical fiber tube 24 to a photoelectric transducer 25. When the master 15 is at the reading position or slit 21 when the contact $rb_1$ (See FIG. 2) is closed in response to the hangup, a flipflop 26 in the logic circuit 7 is set to energize the relay 701. As a result the contact re-1 connects the oscillator 30 to the driving circuit 19 so that the motor 16 rotates at a high speed. Thus the master 15 is immediately removed out of the reading position or slit 21. Meanwhile, the contact $re_2$ is closed so that a buzzer 27 and a lamp 28 are turned on.

Next referring to FIG. 7, the facsimile recorder 4 and the logic circuit 8 will be described in more detail hereinafter. A recording sheet 32 is fed in the direction indicated by the arrow by a pair of feed rollers 34 and 34' which are made into engagement with pinch rollers 35 and 35', respectively, and in turn are driven by a pulse motor 33. In the passage of the recording sheet 32, there are further provided feed rollers 36, 36', 37, 37', 38 and 38'. The pulse motor 33 is driven by a driving circuit 39 which in turn is selectively coupled through a contact $rf_1$ to an oscillator 40 or 41. The contact $rf_1$ is switched by a relay 803 in the logic circuit 8. The oscillation frequency of the oscillator 40 is lower than that of the oscillator 41.

A flip-flop 802 in the logic circuit 8 is normally reset so that the relay 803 remains de-energized. As a result the contact $rf_1$ connects the oscillator 40 to the driving circuit 39 so that the motor 33 rotates at a predetermined recording speed to transport the recording sheet 32. When the recording sheet 32 passes between a pair of electrodes 42 and 43 impressed with a high voltage, an electrostatic latent image is formed upon the recording sheet 32. As the recording sheet 32 passes through a developing station 44, the latent image is developed.

In order to detect whether the recording sheet 32 is at the recording position or not, an optical fiber tube 46 optically coupled to a photoelectric transducer 47 is placed immediately above the passage of the recording sheet 32 between the rollers 34 and 35 and the pair of electrodes 42 and 43 to intercept light from light source 45. The output of the photoelectric transducer 47 is amplified by an amplifier 48 and transmitted through the line 12 to be applied to one input terminal of an AND gate 801 in the logic circuit 8. To the other input terminal of the AND gate 801 is applied the output of the hangup detecting circuit 6 transmitted through the line 10. Therefore when the recording sheet 32 is placed in the facsimile recorder 5 when the contact $rb_1$ (See FIG. 2) of the detecting circuit 6 is closed in response to the hangup of the other subscriber, the flip-flop 702 in the logic circuit 8 is set to energize the relay (RF) 803. As a result, the contact $rf_1$ connects the oscillator 41 to the driving circuit 39 so that the pulse motor 33 rotates at a high speed to discharge the recording sheet 32 immediately out of the facsimile recorder 5. When the recording sheet 32 is discharged through the feed rollers 38 and 38', a microswitch 49 is actuated to reset the flip-flop 802 in the logic circuit 8.

What is claimed is:

1. A first facsimile set of the type interconnecting with a second calling or called facsimile set through a telephone channel, said first set comprising:
   a. a facsimile reader for scanning an image to be transmitted to the second set to convert said image into electrical signals;
   b. a facsimile recorder for reproducing upon a recording sheet an image transmitted from the second facsimile set;
   c. first means for detecting the hangup of the second calling or called facsimile which has been interconnected with the first set through the telephone channel;
   d. second means for detecting whether or not an image to be transmitted to the second set is being scanned by the reader of the first set;
   e. third means for detecting whether or not an image transmitted from the second set is being reproduced upon the recording sheet by the recorder of the first set; and
   f. fourth means for resetting said facsimile reader when the output of said first means representing the hangup of the second set and the output of said second means representing that the image to be transmitted to the second set is being scanned are simultaneously derived in a transmission mode of the first set and for resetting said facsimile recorder when the output of said first means representing the hangup of the second set and the output of said third means representing that image transmitted from the second set is being reproduced are simultaneously derived in a reception mode of the first set.

2. A facsimile set as defined in claim 1 further comprising means for disconnecting said first facsimile set from the telephone channel in response to the detection by said first means of the hangup of the second called or calling facsimile set.

3. A facsimile set as defined in claim 1 further comprising means for producing alarm or warning signals at the first set when the output of said first means and the output of said third means are simultaneously derived.

4. A facsimile set as defined in claim 1 wherein said first means comprises a circuit capable of detecting the polarities of a pair of telephone lines in the telephone channel.

5. A facsimile set as defined in claim 1 wherein said first means comprises a circuit capable of detecting variation in signal level in a pair of telephone lines in the telephone channel.

6. A facsimile set as defined in claim 1 wherein said fourth means include means for driving said facsimile reader and facsimile recorder to their initial positions by higher speed than their respective normal reading or recording speed when the outputs of said first means and of said second means are simultaneously derived or the outputs of said first means and of said third means are simultaneously derived.

7. In a facsimile system of the type interconnecting a facsimile transmitter and receiver through a telephone channel, said facsimile transmitter including at least a facsimile reader for scanning the image to be transmitted to convert the image into the electric signals, a first means for detecting the hangup of said facsimile receiver interconnected through said telephone channel, a second means for detecting whether or not the image to be transmitted is being scanned, and a third means for resetting said facsimile reader to its initial position; said facsimile receiver including at least a facsimile recorder for reproducing the transmitted image upon a recording sheet, a fourth means for detecting the hangup of said facsimile transmitter being interconnected through the telephone channel, a fifth means for detecting whether or not the transmitted image is being reproduced upon the recording sheet, and a sixth means for resetting said facsimile recorder to its initial position, the improvement comprising: means for energizing said third means when the outputs of said first means and of said second means are simultaneously derived, to thereby reset the facsimile reader to its initial position, and means for energizing said sixth means when the outputs of said fourth means and of said fifth means are simultaneously derived, to thereby reset the facsimile recorder to its initial position.

8. In a facsimile system of the type interconnecting a facsimile transceiver at a first end of the system and a facsimile transceiver at a second end of the system through a telephone channel, each transceiver comprising a facsimile reader for scanning an image to be transmitted to the other transceiver to convert it into electrical signals, a facsimile recorder for reproducing an image received from the other transceiver upon a recording sheet, first means for detecting the hangup of the other facsimile transceiver being interconnected through the telephone channel, second means for detecting whether or not an image to be transmitted to the other transceiver is being scanned, third means for detecting whether or not an image received from the other transceiver is being reproduced upon the recording sheet, fourth means for resetting said facsimile reader to its initial position, and fifth means for resetting the facsimile recorder to its initial position, the improvement comprising: means operative when one of the transceivers is transmitting an image and the other transceiver is receiving the transmitted image, for causing the fourth means in the transmitting transceiver to promptly reset the transmitting transceiver's reader to its initial position in response to a detection by the first means in the transmitting transceiver of a hangup of the receiving transceiver and a concurrent detection by the second means in the transmitting transceiver that the image in the reader of the transmitting transceiver is being scanned, and means for causing the fifth means in the receiving transceiver to promptly reset the receiving transceiver's reader to its initial position in response to a detection by the first means in the receiving transceiver of a hangup of the transmitting transceiver and a concurrent detection by the third means in the receiving transceiver that the received image is being recorded.

* * * * *